United States Patent [19]

Thiel et al.

[11] 3,947,543

[45] Mar. 30, 1976

[54] PROCESS FOR RECOVERING COPPER AND NOBLE METALS FROM ORGANIC RESIDUES

[75] Inventors: Reinhold Thiel, Brig; Christoph Zinsstag; Gunther Faschinger, both of Visp, all of Switzerland

[73] Assignee: Lonza, Ltd., Gampel. Valais, Switzerland

[22] Filed: Apr. 16, 1974

[21] Appl. No.: 461,278

[30] Foreign Application Priority Data
Apr. 19, 1973  Switzerland.......................... 5717/73

[52] U.S. Cl. .................. 423/22; 423/27; 252/413; 252/416; 260/604 AC
[51] Int. Cl.$^2$ C01G 55/00; C01G 3/00; B01D 15/06
[58] Field of Search ........ 423/22, 27; 252/411, 413, 252/421, 416, 412; 260/604 AC

[56] References Cited
UNITED STATES PATENTS

| | | | |
|---|---|---|---|
| 1,925,204 | 9/1933 | Reich................................. | 252/421 |
| 2,632,737 | 3/1953 | Stehman............................. | 252/413 |
| 3,154,586 | 10/1964 | Bänder et al................ | 260/604 AC |
| 3,461,157 | 8/1969 | Olivier et al................ | 260/604 AC |
| 3,525,674 | 8/1970 | Barnekey............................ | 252/421 |

*Primary Examiner*—Oscar R. Vertiz
*Assistant Examiner*—Brian E. Hearn
*Attorney, Agent, or Firm*—Christen & Sabol

[57] ABSTRACT

A process for recovering copper and noble metals from organic precipitates, residues and polymerizates which involves subjecting the organic components to a slow, low-temperature carbonization process without the use of any additional heat supplying elements. The metals remain in the ash in the form of salts. Normally the metals in the resulting solution are not separated out but can be recycled directly to the process as active components. No additional components need be added. Typically, the burning process takes place with a conversion rate of approximately one percent per hour. Preferably the burning process takes place at a temperature between 300° and 500°C. The ash is obtained in a form in which it almost completely dissolves in suitable acids, preferably hydrochloric acid. Preferably the process is used to burn the copper and palladium chloride containing residues obtained from the process of the oxidation of ethylene to form acetaldehyde.

14 Claims, No Drawings

PROCESS FOR RECOVERING COPPER AND NOBLE METALS FROM ORGANIC RESIDUES

BACKGROUND OF THIS INVENTION

1. Field of this Invention

This invention relates to a process for recovering copper and noble metals from organic precipitates, residues and polymerizates.

2. Description of the Prior Art

Processes from which the above-type or residues result, are often very important in industry. For example, the oxidation of ethylene in the homogeneous phase in a solution containing hydrochloric acid, copper and palladium chloride, represents the most important process for producing acetaldehyde. It is characterized by a high level of economy and technical efficiency but a solid precipitate which forms in the contract solution during catalysis constitutes a serious disadvantage. This leads to deactivation of the content fluid so that the contact fluid cannot be used for the desired length of time but has to be periodically clarified by filtration or decanted from the precipitated metal containing substances. Also it must be enriched with new metal salts to prevent any blockages in the supply lines, in addition, to the output drop of the reactor. A particular disadvantage is the wastage or lose of costly noble metal which occurs.

Attempts were made to extract the metals from the abovementioned precipitates with acids, for example, hydrochloric acid, but these efforts were not particularly satisfactory — polymerizates which are produced as a precipitate and which firmly encase the metals are most likely formed in the course of the catalysis.

It was also attempted to burn the slurry. However, difficulties are involved in feeding the slurry to the burner as it must either be dried sufficiently until it is solid and thus capable of being added in measured quantities or it must be mixed in water or fuel to form a paste. An extremely awkward step involved in this process is the quantitative collection of the light ash which precipitates from the combustion gases and at best a wet ash is obtained which presents new problems during subsequent processing as it may be contaminated with fuel impurities.

Proposals for distilling these residues and burning them out not only necessitate considerable expenditure on apparatus and the use of combustible material, but also involve problems with exhaust gas. For this reason, such processes have never been commercially employed.

DESCRIPTION OF THIS INVENTION

An object of this invention is to obtain a process for recovering copper and noble metals from organic precipitates, residues and polymerizates. Another object of this invention is to obtain a process for recovering copper and noble metals from the organic residue of a process producing acetaldehyde by the oxidation of ethylene. A further object of this invention is to obtain the product of the aforegoing processes that can readily be recycled. Other objects and advantages of this invention are obvious from this application to those ordinarily skilled in the art.

It was surprisingly discovered that by means of this invention, the difficulties of the prior art could be eliminated or substantially reduced in a simple manner. This application involves a process for recovering copper and noble metals from organic precipitates, residues and polymerizates, which includes subjecting the organic components to a slow burning process without the use of any additional heat supplying elements. The metals remain in the resultant ash in the form of salts, preferably as chlorides and not as oxides. Preferably the process is used to treat the copper and palladium chloride containing residues obtained from the process of the oxidation of ethylene to form acetaldehyde.

It is sufficient merely to ignite the only slightly pre-dried mass at one point, for example, with a small amount of petrol, and leave it to itself. In this way, the organic components almost completely burn — possibly with the catalytic assistance provided by the copper content. The temperature never rises to such an extent that the metal salts are destroyed. As a result, the palladium and copper remain unchanged as chlorides, and no oxides, more particularly, insoluble oxides are produced. As a consequence, the remaining ash dissolves completely in hydrochloric acid and can be added without difficulty to the catalytic solution — this is a preferred embodiment (although the invention encompasses the use of other acids such as sulfuric acid). Since no heat is required, less exhaust gas is produced - thus that problem is kept to a minimum. Foreign ions or other auxilary substances, which do not belong to the system, do not have to be added. The process of this invention is characterized by its simplicity of operation and the minimal technical cost involved. No additional heat sources are required and the process has a very high degree of efficiency.

According to this invention, the air-dried slurry from which the metals are to be recovered are subjected to a slow, low temperature carbonization or burning process where the metals remain as salts in the ash. The exhaust gases from the carbonization process are treated to recovver the ash by precipitation of the ash in a washer. The metals in the ash can be almost completely dissolved in hydrochloric acid. The exhaust gases which are produced thereby may contain subliming salts, for example, copper salts, and must therefore be washed with weak lye or better, with 5% hydrochloric acid, on account of their odor.

The burning or smoldering process takes place very slowly and at the lowest possible temperature, i.e., preferably at temperatures of 300° to 500°C. For example, if approximately 2.5 tons of air dried slurry from the production of acetaldehyde was burned slowly, the combustion rate would be between 20 and 40 kg or 0.02 to 0.04 $m^3$ of slurry per hour, i.e., approximately 1 percent per hour. A typical operation, where 2.5 tons of air dried slurry from the production of acetaldehyde is burned, supplies approximately 375 kg of ash after 3 to 4 days. This ash contains in excess of 95 percent of copper chloride (mainly CuCl) and 0.7 to 0.8 percent of palladium chloride. A hydrochloride solution is obtained from the ash when it is dissolved in hydrochloric acid. By diluting this solution with water it can be adjusted so that it corresponds to the fresh catalyst (contact solution). In this way, the consumption of palladium chloride can be reduced to practically zero.

The following examples illustrates this invention and Example 1 illustrates the preferred embodiment of this invention.

EXAMPLE 1

2 to 3 tons of air dried slurry were distributed on top of eight metal sheets (2 × 1 × 0.2 m). The slurry on each sheet was caused to burn by adding a small amount of paraldehyde and pushing the slurry-covered sheet into a furnace. The exhaust gases from the burning of slurry were passed through a washer. Without any further work, the slurry burned in 3 to 4 days, leaving 300 to 400 kg of ash. The ash was introduced into a tank, which is used to prepare the contact solution, and was mixed with 500 l. of hydrochloric acid (33%) and 500 l. of de-ionized water. The admixture was then agitated with hot steam until a solution was obtained which corresponds to a fresh contact solution in terms of the palladium, copper and hydrochloric acid contents. The solution was used as fresh contact solution, without filtration, in the well-known process for the production of acetaldehyde by the oxidation of ethylene. 2 to 3 kg of solid material (mainly sand and mullite) remained in suspension or were deposited in the tank, while the wastage or loss of palladium copper was practically zero.

EXAMPLE 2

A plant for producing 100 tons of acetaldehyde per day has a consumption of 3 to 4 gm. of palladium per ton of end product (acetaldehyde). The waste slurry produced therefrom was processed using the processing according to this invention, specifically that of Example 1, and returned to the process with supplementary acid — the consumption of palladium was thereby reduced to less than 1 gm. per ton of end product.

What is claimed is:

1. A process for recovering copper and noble metals from an organic precipitate, residue or polymerizate which comprises subjecting the organic components containing the metals in the form of salts to a slow, low-temperature carbonization or burning process, without the use of any additional heat supplying elements, which does not use a temperature that destroys the metal salts and does not produce any insoluble oxides, the metal salts remaining in the ash resulting from the carbonization process, dissolving the portion of said ash remaining from said carbonization or burning process in an acid solution, said metal salts being in solution in said acid, and recovering the portion of said ash which is entrained in the exhaust gases from said carbonization or burning process by precipitation in an aqueous washer treating said exhaust gases.

2. The process according to claim 1 wherein said acid is hydrochloric acid.

3. The process according to claim 2 wherein said noble metal is palladium and said metals are present in the form of chlorides.

4. The process according to claim 2 wherein said organic components are in a slurry form which are air-dried before being used.

5. The process of claim 2 wherein said solution containing said metal salts is diluted with water and recycled by adding it to the active components of the process from which the organic precipitate, residue or polymerizate is obtained.

6. The process of claim 2 wherein the ash includes in excess of 95 percent copper chloride and 0.7 to 0.8 percent palladium chloride.

7. The process of claim 2 wherein 16.5 percent hydrochloride acid is used.

8. The process of claim 2 wherein said ash and hydrochloric acid are agitated with hot steam until said metal salts are dissolved in said hydrochloric acid.

9. The process according to claim 2 wherein the carbonization process is conducted at a conversion rate of approximately one percent per hour.

10. The process according to claim 2 wherein the carbonization process is conducted at between 300° and 500°C.

11. The process according to claim 2 wherein said washer treatment utilizes a weak lye solution or a 5 percent hydrochloric acid solution.

12. A process according to claim 2 wherein the ash received in said washer treatment is precipitated in a form in which it dissolves practically completely in hydrochloric acid.

13. A process according to claim 2 wherein the process is used to carbonize the copper-and-palladium-chloride containing residues obtained from the oxidation of ethylene to form acetaldehyde.

14. The process according to claim 2 wherein said acid is sulfuric acid.

* * * * *